United States Patent
Couwenhoven et al.

(10) Patent No.: US 7,362,472 B2
(45) Date of Patent: Apr. 22, 2008

(54) COLOR ERROR DIFFUSION

(75) Inventors: Douglas W. Couwenhoven, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 741 days.

(21) Appl. No.: 10/794,133

(22) Filed: Mar. 5, 2004

(65) Prior Publication Data

US 2005/0195437 A1    Sep. 8, 2005

(51) Int. Cl.
*G06F 15/00* (2006.01)
*G06K 15/00* (2006.01)

(52) U.S. Cl. ............... 358/3.03; 358/1.9; 358/3.05; 358/3.06; 358/534; 382/252; 345/597; 345/616

(58) Field of Classification Search ............. 358/3.03, 358/3.04, 3.05, 3.06, 534; 382/251, 252; 345/616, 597
See application file for complete search history.

(56) References Cited

U.S. PATENT DOCUMENTS

| | | | | |
|---|---|---|---|---|
| 5,007,102 A | * | 4/1991 | Haskell | 382/238 |
| 5,070,413 A | * | 12/1991 | Sullivan et al. | 358/3.03 |
| 5,375,002 A | * | 12/1994 | Kim et al. | 358/521 |
| 5,493,416 A | * | 2/1996 | Fan | 358/447 |
| 5,565,994 A | | 10/1996 | Eschbach | |
| 5,742,405 A | * | 4/1998 | Spaulding et al. | 358/3.1 |
| 5,757,517 A | * | 5/1998 | Couwenhoven et al. | 358/463 |
| 5,767,886 A | * | 6/1998 | Kawakami et al. | 347/115 |
| 5,805,734 A | * | 9/1998 | Ebner | 382/237 |
| 5,940,541 A | * | 8/1999 | Donelly | 382/252 |
| 5,991,438 A | * | 11/1999 | Shaked et al. | 382/162 |
| 6,356,361 B1 | * | 3/2002 | Ishikawa et al. | 358/1.9 |
| 6,501,564 B1 | * | 12/2002 | Schramm et al. | 358/1.9 |
| 6,637,851 B2 | * | 10/2003 | Velde et al. | 347/15 |
| 2002/0097456 A1 | * | 7/2002 | Yamada et al. | 358/536 |
| 2004/0184056 A1 | * | 9/2004 | Ikeda | 358/1.9 |

FOREIGN PATENT DOCUMENTS

JP          11055535 A   *  2/1999

OTHER PUBLICATIONS

IEEE IPA97 Conference Publication No. 443□□Title: Optimal Image Segmentation by Error Diffusion□□Inventors: DM Bethel, NK Laurance, and BG Sherlock□□Publication Date: Jul. 17, 1997.*

(Continued)

*Primary Examiner*—King Y. Poon
*Assistant Examiner*—Richard Z Zhu
(74) *Attorney, Agent, or Firm*—Raymond L. Owens

(57) ABSTRACT

A method for multi-toning an input digital image having input pixels with two or more color channels to form an output digital image having modified output levels. The method includes producing an error signal for each color channel, combining the error signals to produce a combined error signal, sorting the error signals to produce a set of sorted error signals, and determining modified output levels responsive to the set of sorted error signals and the combined error signal.

21 Claims, 5 Drawing Sheets

OTHER PUBLICATIONS

Japanese Machine Translation of JP 11-055535 A, Title: Image Processor, Inventor: Toru Ikeda, Publication Date: Feb. 26, 1999.*

IEEE IPA97 Conference Publication No. 443, "Optimal Image Segmentation by Error Diffusion", DM Bethel, NK Laurance, BG Sherlock, Jul. 17, 1997.*

Translation of JP 11-055535, "Image Processor", Toru Ikeda, Feb. 26, 1999.*

"Digital Color Halftoning" by H. Kang, SPIE Optical Engineering Press, 1999.

* cited by examiner

COLOR ERROR DIFFUSION

CROSS REFERENCE TO RELATED APPLICATIONS

Reference is made to commonly assigned U.S. patent application Ser. No. 10/795,011 filed Mar. 5, 2004 by Couwenhoven, et al., entitled "Multi-level Halftoning Providing Improved Texture Uniformity", the disclosure of which is herein incorporated by reference.

FIELD OF THE INVENTION

The present invention relates to the field of digital image processing, and more particularly to a method for digitally halftoning a continuous-tone image using error diffusion.

BACKGROUND OF THE INVENTION

Digital halftoning is a technique employing digital image processing to produce a halftone output image from a continuous-tone input image. In the digital halftoning technique, a continuous-tone image is sampled, for example, with a scanner or digital camera, and the samples are digitized and stored in a computer. The digitized samples (or "pixels") include discrete code values having $N_i$ possible input levels (typically $N_i=256$, with code values ranging from 0 to 255). To reproduce this image with high quality on an output device which can print $N_o$ output levels, where $N_o<N_i$, it is necessary to produce the sensation of intermediate gray levels by suitably distributing the printed dots in the output image using some form of halftoning technique. One example of an output device requiring halftoning is an inkjet printer, which ejects a volume of ink at each output pixel to reproduce the image. The number of output levels ($N_o$) of the printer is the number of possible volumes deposited at each pixel (including 0), and is typically in the range of 2-32.

One prior art method of digital halftoning is known as error diffusion. FIG. 1 shows a block diagram describing a basic error diffusion technique. The continuous-tone input level for one pixel of the input image is shown as X. For purposes of illustration it will be assumed that the continuous-tone input level spans the range from 0 to 255. The input level X is added to a weighted error signal $X_{fe}$ using a summer 10 to produce a modified input level $X_{in}$. (The generation of the weighted error signal $X_{fe}$ will be discussed shortly.) The modified input level $X_{in}$ for the current pixel is quantized using a quantizer 20 to form the quantized output level $X_o$. For a binary error diffusion algorithm, the quantizer 20 will output a 0 for any input level below a threshold (typically code value 128), and a 255 for any input level above the threshold. A summer 30 receives the modified input level $X_{in}$ and the quantized output level $X_o$ and produces an error signal $X_{err}$ representing the error introduced by the quantization process. The error signal $X_{err}$ is multiplied by a series of error feedback weights using a weighted error generator 40 to produce the weighted error signal $X_{fe}$, which is added to the continuous-tone input levels of nearby pixels which have yet to be processed using summer 10. The propagation of the errors made during the quantization process to the nearby pixels insures that the arithmetic mean of the pixel values is preserved over a local image region.

FIG. 2 shows a typical set of error feedback weights used in the prior art. The error for the current pixel, located at (column,row)=(i,j) of the image, is weighted by the error feedback weights, and added to nearby pixels yet to be processed. In this example, there are four error feedback weights having the same value of ¼, with the sum of the error feedback weights being 1. This ensures that the arithmetic mean of the image is preserved.

When using the standard error diffusion algorithm to process a color image, a technique common in the prior art is to apply the error diffusion algorithm independently to each color channel. See, for example, U.S. Pat. No. 5,757,517 to Couwenhoven, et al. This arrangement is shown for processing an image with cyan (C), magenta (M), and yellow (Y) color channels in FIG. 3. This arrangement is successful at preserving the arithmetic mean of the image data in each color channel, resulting in the correct output color, but suffers from the fact that the placement of the output dots in each color channel is decorrelated, and overprints can unnecessarily occur, resulting in an undesirable noisy, grainy appearance to the printed image. To illustrate this, consider that a 16×16 pixel image containing a 30% tint of uniform CMY code values is to be halftoned to 2 levels (on, off) and printed on an inkjet printer. As shown in FIG. 4, the CMY color channels, when processed independently with the error diffusion algorithm, produce dot patterns that typically resemble the cyan, magenta, and yellow patterns shown as patterns 50, 60, and 70, respectively. In these patterns, the black pixels indicate locations where an ink dot will be printed, and white locations indicate white paper. When these three patterns are printed on top of each other on the page, an output pattern 80 will result. (Due to the black and white reproduction of output pattern 80 in this document, only the luminance of the pattern is shown). Each pixel in the output pattern 80 can be one of eight colors: white; C; M; Y; red (C+Y); green (C+Y); blue (C+M); or black (C+M+Y). The luminance modulation between the darker pixels (R, G, B, or black) and the lighter pixels (white, C, M, or Y) produces an undesirable grainy appearance to the human eye. Interestingly, this is not necessary, since the original input image was a 30% tint of CMY, therefore it should have been possible to produce the output image using non-overlapping patterns such that only white, C, M, or Y are produced at each pixel. The luminance modulation between these colors would be much less, providing a more pleasing result.

Error diffusion methods that attempt to provide correlation between the color channels are known in the prior art. These algorithms are sometimes called "vector error diffusion" algorithms. Chapter 16 of "Digital Color Halftoning", by H. Kang (SPIE Optical Engineering Press, 1999) describes several vector error diffusion techniques. U.S. Pat. No. 5,375,002 to Kim, et. al., discloses a color error diffusion method in which an error look-up table is used to help determine the color of an output pixel. U.S. Pat. NO. 5,565,994 to Esbach discloses an error diffusion method in which output signals from one color channel are used to determine threshold values for other color channels to provide some decorrelation between the color channels. U.S. Pat. NO. 6,637,851 to Van de Velde, et al., discloses an error diffusion method in which a luminance signal is computed and separately error diffused as an additional channel. The luminance information is then used to guide the selection of the output pixel colors. Typically, the prior art methods are computationally complex, requiring substantial additional processing power and/or memory.

Therefore, there is a need for a color error diffusion method which provides for high quality printed images with reduced graininess, and can be implemented efficiently without requiring substantial additional computing power or memory.

SUMMARY OF THE INVENTION

It is an object of the present invention to provide printed color images with reduced graininess.

It is a further object of the present invention to provide for improved quality of printed color images while reducing the amount of computer memory and computer processing power required to process the images.

Still another object of the present invention is to provide for high quality color images when printed on an inkjet printer.

These objects are achieved by a method for multi-toning an input digital image having input pixels with two or more color channels, each color channel, C, having a specified number of input levels, $N_i$, to form an output digital image having modified output levels, each color channel of the output digital image having a specified number of output levels, $N_o$, where $2 \leq N_o < N_i$, comprising:

a) quantizing the input level for each color channel of a pixel in the input digital image to determine a quantized output level for each color channel;

b) producing an error signal for each color channel representing a difference between the input level and the quantized output level;

c) combining the error signals for each color channel to produce a combined error signal;

d) sorting the error signals for each color channel to produce a set of sorted error signals;

e) determining modified output levels for each color channel responsive to the quantized output levels, the combined error signal, and the sorted error signals;

f) producing a modified error signal for each color channel responsive to the input level and the modified output level;

g) weighting the modified error signals for each color channel by a set of error feedback weights and adjusting the corresponding input levels for nearby pixels that have yet to be processed; and h) repeating steps a)-g) for multiple input pixels of the input digital image to thereby provide the output digital image.

ADVANTAGES

The present invention has an advantage over the prior art in that it provides for improved image quality in printed images by providing for reduced graininess in the printed image. The improved image quality is obtained using minimal extra computing resources, such as memory and CPU cycles. This permits the invention to be implemented efficiently so it can be applied in a large number of applications, including those with limited processing power and/or memory.

DETAILED DESCRIPTION OF THE INVENTION

This invention describes a method for halftoning a digital image using a color error diffusion method in which the output dot patterns are decorrelated for the color channels. This means that overprints of the printer's colorants will be reduced, producing a printed image with reduced graininess.

A preferred embodiment of the present invention will now be described. The invention will be described as applied to a color image having three color channels, corresponding to cyan (C), magenta (M), and yellow (Y) colorants. It will be understood by one skilled in the art that the invention applies equally well to printers having different colorants, as well as printers having more colorants, such as a CMYK ink set typically found in inkjet printers. The present invention will also be described in the context of a binary inkjet printer which can print either 0 or 1 drops of ink of each color at each pixel, but the fundamental aspects of the invention apply to any printing technology in which a halftoning (or multi-level halftoning using more than 2 output levels) step is employed.

Figure 5:
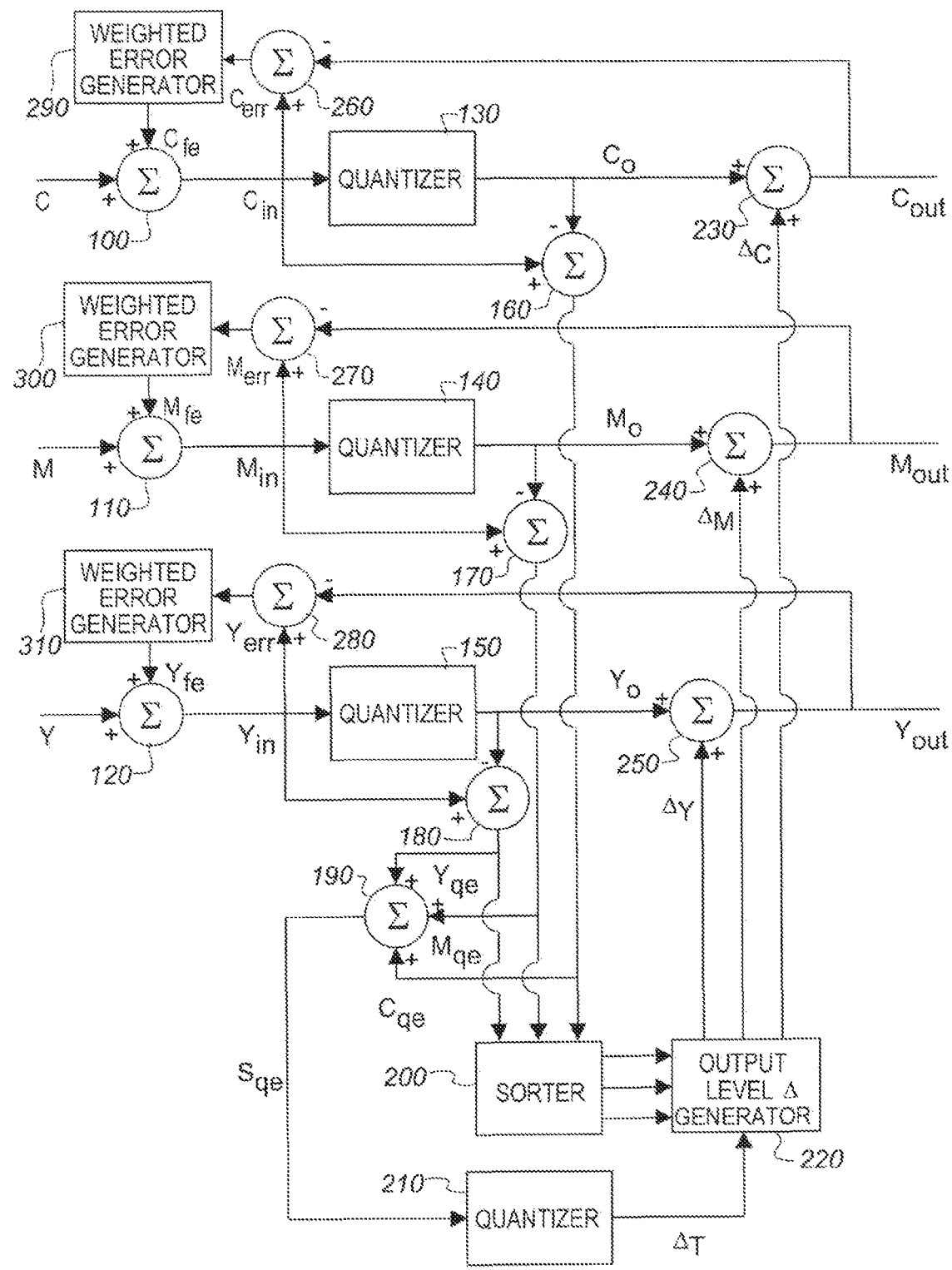
FIG. 5 is a flow diagram showing a color error diffusion algorithm according to a preferred embodiment of the present invention.

Turning to FIG. 5, the fundamental aspects of a preferred embodiment of the present invention will now be described. FIG. 5 is a flow diagram showing the logic flow of a preferred embodiment of the color error diffusion method according to the present invention. In this example, continuous-tone input values for an image having CMY color channels are shown by the signals C, M, and Y, respectively, entering the diagram on the left. The input level C, M, or Y is added to a weighted error signal ($C_{fe}$, $M_{fe}$, or $Y_{fe}$ respectively) using summers 100, 110, and 120 to produce modified input levels $C_{in}$, $M_{in}$, and $Y_{in}$ according to:

$$C_{in} = C + C_{fe}$$

$$M_{in} = M + M_{fe}$$

$$Y_{in} = Y + Y_{fe}.$$

(The generation of the weighted error signals $C_{fe}$, $M_{fe}$, and $Y_{fe}$ will be discussed shortly.) The modified input levels $C_{in}$, $M_{in}$, and $Y_{in}$ for the current pixel are quantized using quantizers 130, 140, and 150 to form the quantized output levels $C_o$, $M_o$, and $Y_o$. The function of the quantizers 130, 140, and 150 are to select the nearest available output level less than or equal to the input level for each color channel. In a preferred embodiment, the quantizers 130, 140, and 150 are implemented using a look-up table indexed with the input level, which returns the desired output level directly. The construction of this form of quantization look-up table will be understood by one skilled in the art. In another embodiment of the present invention, the quantizers 130, 140, and 150 are implemented using an integer division operation, as follows. The modified input level is divided by the quantization interval size, and the integer portion of the result is used as the quantized output level, according to:

$$Q=(N_i-1)/(N_o-1)$$

$$C_o=\text{int}(C_{in}/Q)$$

$$M_o=\text{int}(M_{in}/Q)$$

$$Y_o=\text{int}(Y_{in}/Q)$$

where:
Q is the quantization interval size;
$N_i$ is the number of possible input levels;
$N_o$ is the number of possible output levels; and
$2 \leq N_o < N_i$, and int( ) is the integer function.

Still referring to FIG. 5, after the quantized output levels are determined, summers 160, 170, and 180 are used to compute an error signal for each color channel according to:

$$C_{qe}=C_{in}-C_o$$

$$M_{qe}=M_{in}-M_o$$

$$Y_{qe}=Y_{in}-Y_o.$$

The error signal for each color channel represents the difference between the input level and the quantized output level for each color channel caused by the quantizers. Since the number of input levels, $N_i$, and the number of output levels, $N_o$, are different, then it is important to compute the error signals between appropriately scaled versions of the input level and quantized output levels. For example, if we have $N_i=256$ input levels, and $N_o=2$, then for purposes of computing the error signal, in a preferred embodiment, the output levels that are used are 0 and 255, instead of 0 and 1. In other words, the input level and the quantized output level need to be scaled to the same data range for computing the error signals. This will be well understood by one skilled in the art. In another embodiment of the present invention, the error signals $C_{qe}$, $M_{qe}$, and $Y_{qe}$ can be computed using an integer division operation, as follows. The modified input level is divided by the quantization interval size (as computed earlier), and the remainder portion of the result is used as the error signal, according to:

$$C_{qe}=\text{rem}(C_{in}/Q)$$

$$M_{qe}=\text{rem}(M_{in}/Q)$$

$$Y_{qe}=\text{rem}(Y_{in}/Q)$$

where rem ( ) is the remainder function, which returns the portion remaining after the integer division of the argument (e.g., rem(27/5)=2).

After they are determined, the error signals $C_{qe}$, $M_{qe}$, and $Y_{qe}$ are then input to a summer 190 to produce a combined error signal $S_{qe}$ according to:

$$S_{qe}=C_{qe}+M_{qe}+Y_{qe}.$$

The quantized output levels represent the "number of output levels" that will be turned on at the current pixel. For example, in the case of a binary printer, $\{C_o, M_o, Y_o\}=\{255, 0, 0\}$ means that one output level will be used at this pixel, and it will result in a cyan dot being printed. The combined error signal represents the total number of "extra" output levels that are needed to preserve the arithmetic mean of the image. For example, if $\{C_{qe}, M_{qe}, Y_{qe}\}=\{51, 179, 93\}$, then $S_{qe}=323$, which means that 323/255=1.27 "extra" output levels are needed at this pixel. Exactly how to incorporate the extra output levels represented by the combined error signal is discussed hereinbelow.

The error signals, $C_{qe}$, $M_{qe}$, and $Y_{qe}$, passed to a sorter 200 which sorts the error signals into a set of sorted error signals. In a preferred embodiment of the present invention, the error signals are sorted in descending order from largest to smallest. The combined error signal, $S_{qe}$, is input to a quantizer 210 which outputs a total output level increment, $\Delta T$. The quantizer 210 is preferably implemented using a look-up table indexed by the combined error signal, $S_{qe}$, and outputs the total output level increment, $\Delta T$, directly. In another embodiment, the quantizer 210 can be implemented using integer division as follows. The modified input level is divided by the quantization interval size, and the integer portion of the result is used as the quantized output level, according to:

$$\Delta T=\text{int}(S_{qe}/Q)$$

where Q is the quantization interval size, as described earlier. Thus, $\Delta T$ represents the integer number of "extra" levels that are needed at this pixel. Using $\{C_{qe}, M_{qe}, Y_{qe}\}=\{51, 179, 93\}$, and $S_{qe}=323$, the total output level increment is computed as $\Delta T=\text{int}(323/255)=1$. Thus, in this example, it is desired to increment the output level for one of the colors at this pixel.

Still referring to FIG. 5, an output level delta generator 220 receives the total output level increment, $\Delta T$, from the quantizer 210 and the set of sorted error signals from sorter 200. The color channel having the largest error signal, which corresponds to the first entry in the set of sorted error signals, is the color channel that is in the most "need" of having the output level incremented. In other words, the color channel with the largest error signal is the first one that should be incremented, and $\Delta T$ represents the integer number of extra output levels that are desired. Thus, according to a preferred embodiment, the output level delta generator 220 computes output level increments $\Delta C$, $\Delta M$, and $\Delta Y$ to increment the first $\Delta T$ color channels in the sorted error signal list by one output level. Using $\{C_{qe}, M_{qe}, Y_{qe}\}=\{51, 179, 93\}$, the set of sorted error signals would be $\{M_{qe}, Y_{qe}, C_{qe}\}=\{179, 93, 51\}$, indicating that magenta was in the most need of having its output level incremented. In the example, $\Delta T=1$, so output level increments of $\{\Delta C, \Delta M, \Delta Y\}=\{0, 255, 0\}$ would be computed by the output level delta generator 220. In a preferred embodiment the sorter 200 need only perform a partial sort of the error signals, since it will be common that only the one or two largest signals will need to be identified. In the current example, $\Delta T=1$, so only the color channel with the largest error signal need be identified. This provides for a significant savings in computing time, since the sorting operation implemented by the sorter 200 generally requires noticeable extra processing time to execute.

Once the output level increments $\Delta C$, $\Delta M$, and $\Delta Y$ are determined, they are passed along to summers 230, 240, and 250 respectively, wherein modified output levels $C_{out}$, $M_{out}$, and $Y_{out}$ are computed according to:

$$C_{out}=C_o+\Delta C$$

$$M_{out}=M_o+\Delta M$$

$$Y_{out}=Y_o+\Delta Y.$$

The modified output levels $C_{out}$, $M_{out}$, and $Y_{out}$ represent the actual output levels that are printed on the page. Once they are computed, the modified output levels $C_{out}$, $M_{out}$, and $Y_{out}$ are input to summers 260, 270, and 280 respectively, which also receive the modified input levels $C_{in}$, $M_{in}$, and $Y_{in}$, respectively, to produce modified error signals $C_{err}$, $M_{err}$, and $Y_{err}$ according to:

$$C_{err}=C_{in}-C_{out}$$

$$M_{err}=M_{in}-M_{out}$$

$$Y_{err}=Y_{in}-Y_{out}.$$

Figure 1:
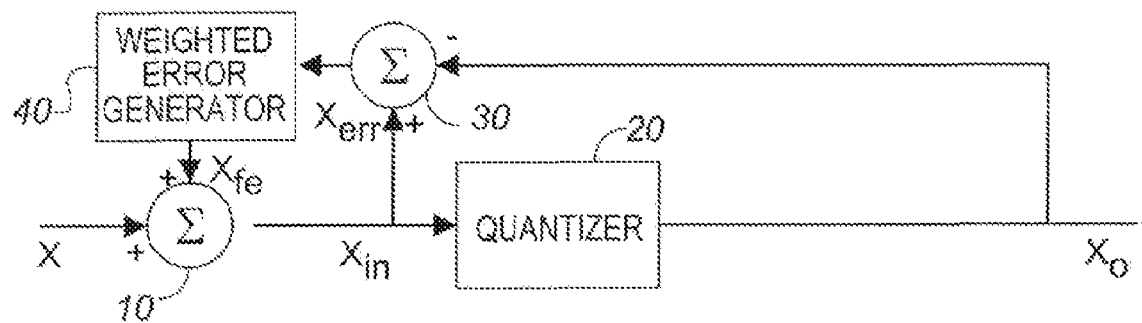
FIG. 1 is a flow diagram showing the functioning of a standard error diffusion algorithm according to the prior art.
Figure 2:
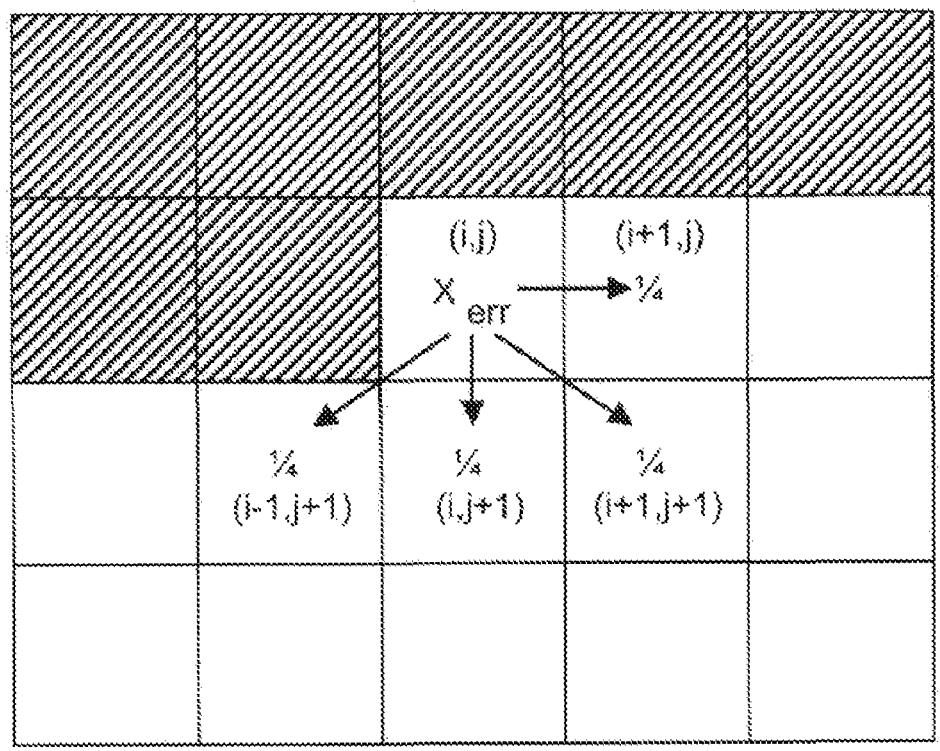
FIG. 2 is diagram showing a typical set of error feedback weights according to the prior art.
Figure 2:
Figure 2:
Figure 3:
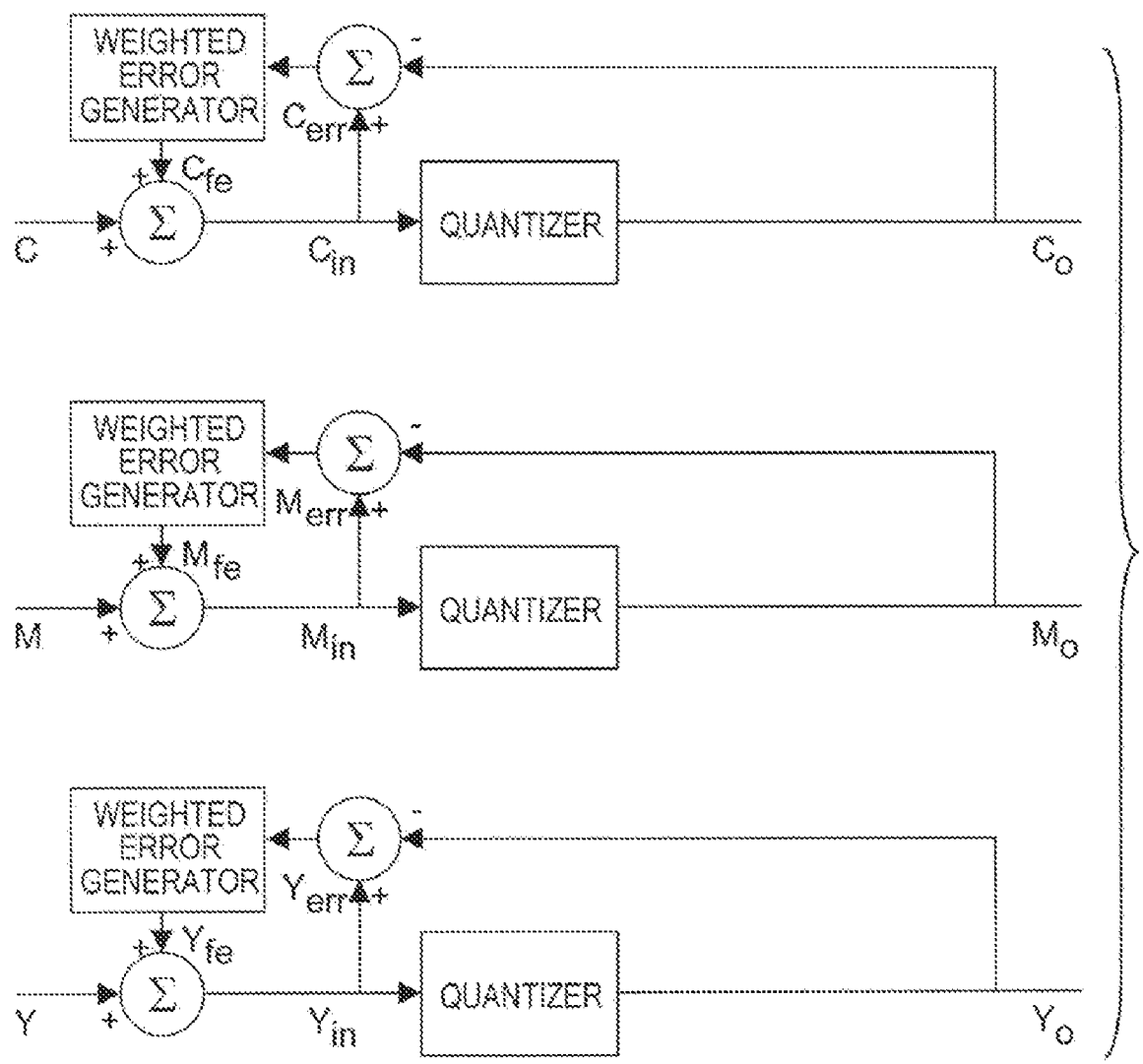
FIG. 3 is a flow diagram showing the functioning of a standard error diffusion algorithm applied to a color image according to the prior art.
Figure 4:
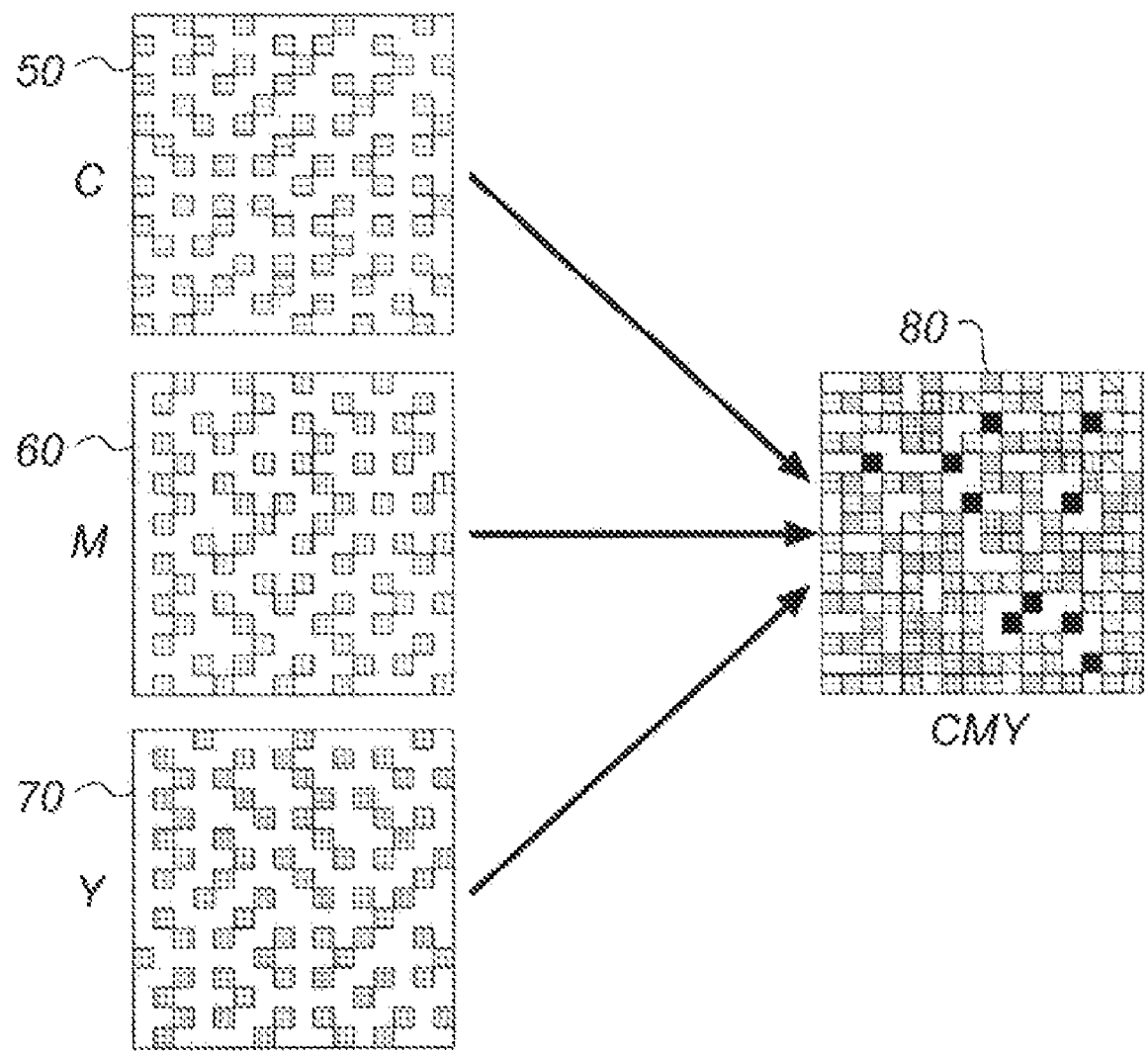
FIG. 4 is a diagram showing example color separation and overprint patterns according to a prior art color error diffusion algorithm.

The modified error signal for each color channel represents the difference between the modified input level and the modified output level for each color channel caused by the entire color error diffusion process. (As before, since the number of input levels, $N_i$, and the number of output levels, $N_o$, are different, then it is important to compute the modified error signals between appropriately scaled versions of the modified input level and modified output levels). Once determined, the modified error signals for each color channel are input to weighted error generators 290, 300, and 310. The weighted error generators perform the function of distributing the error to nearby pixels in the corresponding color channel that have yet to be processed, as described earlier. In a preferred embodiment, the weighted error generator will distribute the modified error signal for each color channel to input pixels to the right and/or below the current input pixel in the image, as shown in FIG. 2. Those skilled in the art will recognize that many different error feedback weights can be applied within the scope of the invention, including using different weights and/or a different number of weights spanning a larger or smaller region of input pixels, and that the selection of the particular error feedback weights is not fundamental to the invention. The weighted error generators 290, 300, and 310 produce weighted error signals $C_{fe}$, $M_{fe}$, and $Y_{fe}$, respectively. The weighted error signals are then added to the input levels C, M, and Y of nearby pixels that have yet to be processed using summers 100, 110, and 120, and processing continues with the next pixel in the image.

Figure 6:
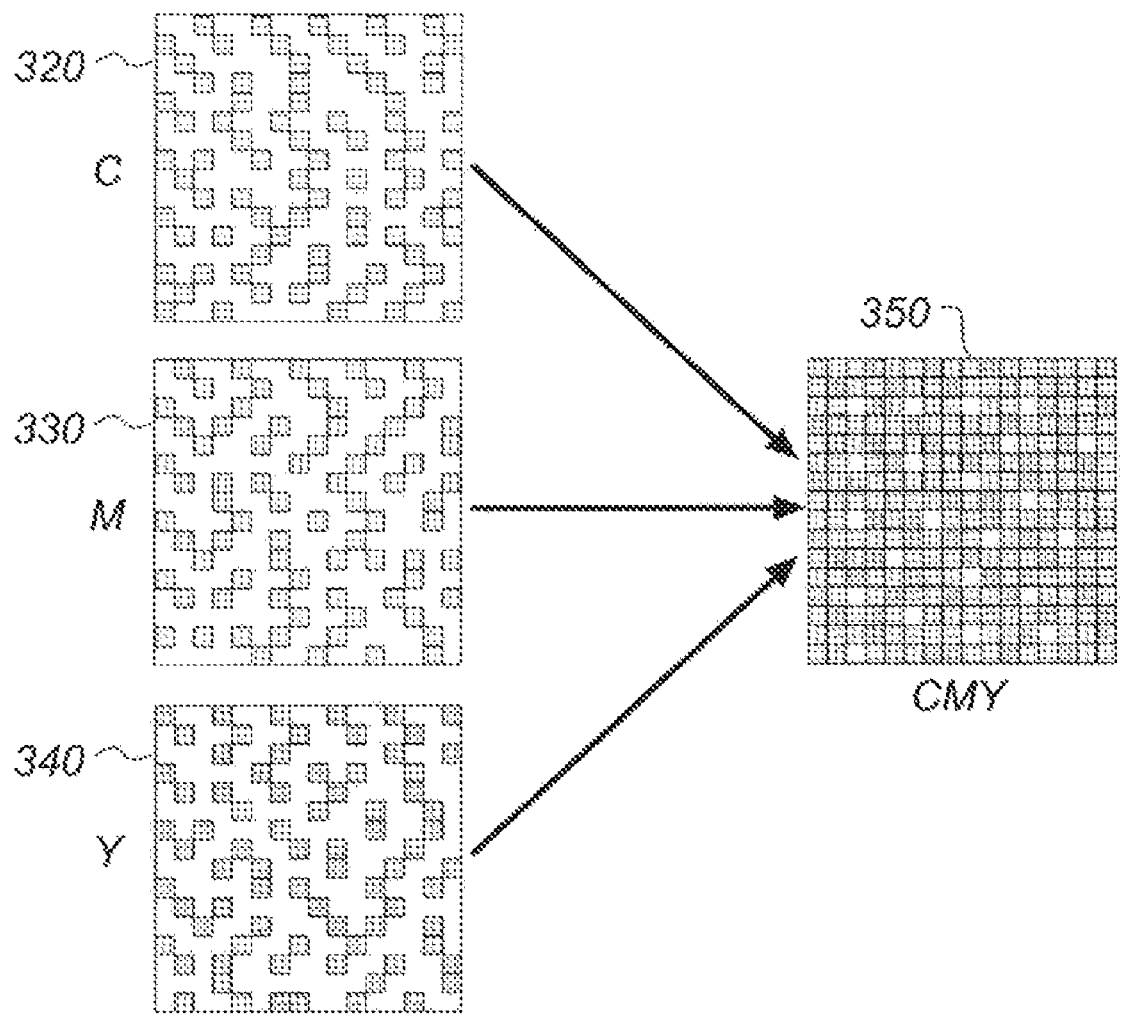
FIG. 6 is a diagram showing example color separation and overprint patterns according to the present invention.

Turning now to FIG. 6, consider that the same 16×16 pixel image containing a 30% tint of uniform CMY code values described earlier is now to be halftoned to 2 levels (on, off) and printed on an inkjet printer using the method of the present invention. As shown in FIG. 6, the CMY color channels, when processed in accordance with the present invention, produce cyan, magenta, and yellow dot patterns 320, 330, and 340, respectively. In these patterns, the black pixels indicate locations where an ink dot will be printed, and white locations indicate white paper. When these three patterns are printed on top of each other on the page, an output pattern 350 will result. (Due to the black and white reproduction of output pattern 350 in this document, only the luminance of the pattern is shown). Each pixel in the output pattern 350 is now reproduced with only one of the lighter pixels (white, C, M, or Y), which produces a less grainy appearance to the human eye when compared to the prior art CMY dot pattern 80. The present invention achieves this pleasing result without requiring substantial extra computer memory or processing power, thereby providing an advantage over the prior art.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention. For example, the present invention has been described in the context of an inkjet printer which prints with CMY colorants, but in theory the invention should apply to other types of printing technologies also, as well as inkjet printers using different color inks other than CMY, including inkjet printers with CMYK colorants, as well as photo inkjet printers using light density versions of some of the inks in addition to the standard CMYK set.

The present invention can also be equally well applied to printers having multiple output levels, such as an inkjet printer that can produce multiple drop sizes. It is also possible to combine the present invention with other error diffusion techniques, such as Yu, et al., in U.S. Pat. No. 6,271,936.

PARTS LIST

- 10 summer
- 20 quantizer
- 30 summer
- 40 weighted error generator
- 50 C dot pattern
- 60 M dot pattern
- 70 Y dot pattern
- 80 CMY dot pattern
- 100 summer
- 110 summer
- 120 summer
- 130 quantizer
- 140 quantizer
- 150 quantizer
- 160 summer
- 170 summer
- 180 summer
- 190 summer
- 200 sorter
- 210 quantizer
- 220 output level delta generator
- 230 summer
- 240 summer
- 250 summer
- 260 summer
- 270 summer
- 280 summer
- 290 weighted error generator
- 300 weighted error generator
- 310 weighted error generator
- 320 C dot pattern
- 330 M dot pattern
- 340 Y dot pattern
- 350 CMY dot pattern

The invention claimed is:

1. A method for multi-toning an input digital image having input pixels with two or more color channels, each color channel, C, having a specified number of input levels, $N_i$, to form an output digital image having modified output levels, each color channel of the output digital image having a specified number of output levels, $N_o$, where $2 \leq N_o < N_i$, comprising:

a) quantizing the input level for each color channel of a pixel in the input digital image to determine a quantized output level for each color channel;

b) producing an error signal for each color channel representing a difference between the input level and the quantized output level;

c) summing the error signals for each color channel to produce a combined error signal representing a total number of additional output level increments;

d) sorting the error signals for each color channel to produce a set of sorted error signals;

e) determining modified output levels for each color channel by modifying the quantized output levels for the color channels having the largest magnitude sorted error signals, wherein the number of color channels to be modified is determined from the combined error signal;

f) producing a modified error signal for each color channel responsive to the input level and the modified output level;

g) weighting the modified error signals for each color channel by a set of error feedback weights and adjusting the corresponding input levels for nearby pixels that have yet to be processed; and h) repeating steps a)-g) for every input pixel of the input digital image to thereby provide the output digital image.

2. The method according to claim 1 wherein the quantization operation in step a) includes performing an integer division operation.

3. The method according to claim 2 wherein the integer division operation includes dividing the input level for each color channel by a quantization interval size and taking the integer portion.

4. The method according to claim 3 wherein the quantization interval size is $(N_i-1)/(N_o-1)$.

5. The method according to claim 1 wherein the quantization operation in step a) is accomplished using a look-up table.

6. The method according to claim 1 wherein step b) includes producing a difference between appropriately scaled versions of the input level and the quantized output level.

7. The method according to claim 1 wherein step b) includes dividing the input level for each color channel by a quantization interval size and taking the remainder portion.

8. The method according to claim 1 wherein step e) includes producing a total output level increment, $\Delta T$.

9. The method according to claim 8 wherein the total output level increment, $\Delta T$, is the integer portion of the combined error signal divided by a quantization interval size.

10. The method according to claim 9 wherein the quantization interval size is $(N_i-1)/(N_o-1)$.

11. The method according to claim 9 wherein the total output level increment $\Delta T$ is determined using a look-up table that returns the total output level increment as a function of the combined error signal.

12. The method according to claim 8 wherein the modified output levels for each color channel are determined by incrementing the output levels for a number of color channels having the largest sorted error signals, wherein the number of color channels is equal to $\Delta T$.

13. The method according to claim 1 wherein step d) includes sorting the error signals for each color channel into descending order from largest to smallest.

14. The method according to claim 8 wherein step d) includes performing a partial sort that determines a number of color channels having the largest error signals, wherein the number of color channels is equal to $\Delta T$.

15. The method according to claim 1 wherein step f) includes producing a difference between appropriately scaled versions of the input level and the modified output level.

16. The method according to claim 1 wherein step g) includes multiplying the modified error signals for each color channel by the set of error feedback weights to form weighted error signals, and then adding the weighted error signals to the input levels for the corresponding color channels for nearby pixels that have yet to be processed.

17. The method according to claim 16 wherein the weighted error signals are added to pixels to the right and/or below the current pixel.

18. The method according to claim 16 wherein the set of error feedback weights sum to one.

19. The method according to claim 1 wherein the color channels include cyan, magenta and yellow color channels.

20. The method according to claim 1 wherein the color channels include a black color channel.

21. A computer readable storage medium encoded with a computer program thereon for practicing the method according to claim 1.

* * * * *